Sept. 23, 1952 V. RAWLS 2,611,411
TIRE LUG FOR RELUGGING TIRES
Filed March 23, 1950
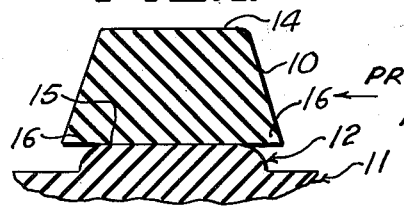
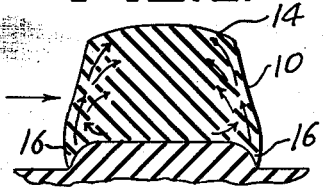
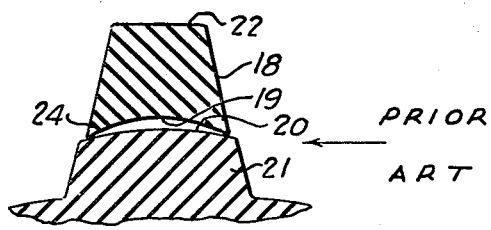
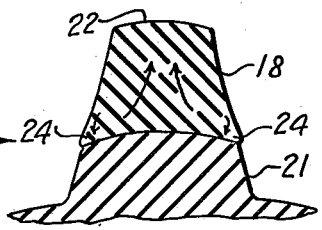
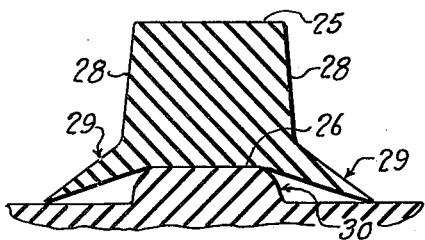
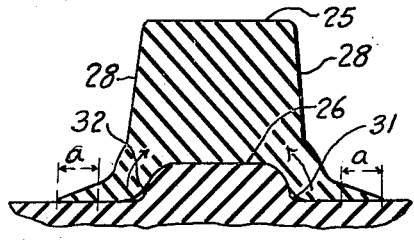
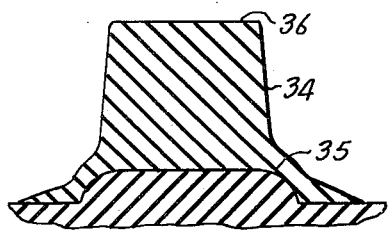
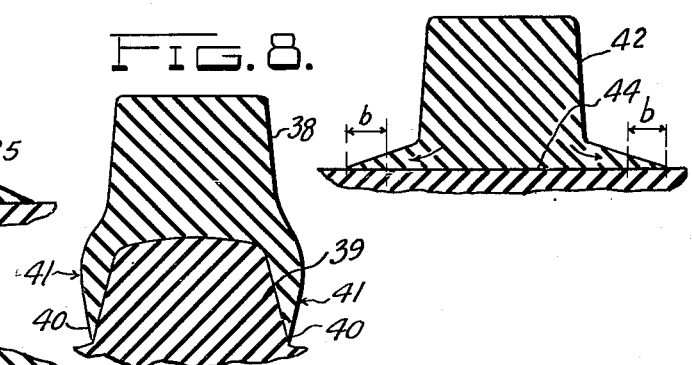
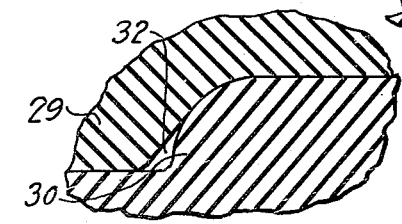
INVENTOR.
Vaughn Rawls
BY
Owen & Owen
ATTORNEYS Patented Sept. 23, 1952

2,611,411

UNITED STATES PATENT OFFICE 2,611,411

TIRE LUG FOR RELUGGING TIRES

Vaughn Rawls, Lima, Ohio

Application March 23, 1950, Serial No. 151,369
In Great Britain March 11, 1950

6 Claims. (Cl. 152—209)

This invention relates to tire lugs or lug stock for individually relugging worn or damaged lugs, and particularly to lug stock for relugging heavy duty or off-the-road tires, and to an improved method of relugging such tires.

Tire lugs or lug stock as referred to hereafter are made of any suitable material such as rubber, synthetic rubber or rubber substitutes, among which is included the material known in the rubber industry as "camel back."

Even though the art of retreading tires is quite old and has been widely practiced, the relugging of off-the-road tires, such as tractor tires and tires used by large earth moving equipment, has seldom been attempted and then only recently with any degree of success. The replacement of the tire lugs with the usual flat bottom lug stock has never been successful, since the lug stock could not be made to adhere strongly to the old lug. As an alternative, the entire surface of the tire was ground down and the tire recapped with sheet material having lugs formed therein. This process is quite expensive and has never been widely adopted, because an entirely new tire could be purchased for just slightly more than the cost of this relugging process.

The problem of adherence encountered in relugging processes is directly due to the fact that the lugs are normally positioned perpendicular to, or at an angle of about 45° to, the direction in which power is applied to the wheel carrying the tire. As a consequence, the entire driving force moves against the leading edge of the lug, and the stresses raised by the driving force in the lug are further magnified by the moment of torque between the traction surface of the lug and its base, usually a matter of at least an inch. The stresses created by this lever or torque action on the leading surface of the lug concentrate at the junction of the leading edge of the lug and the tire body, so that perfect bonding of the lug to the old tire surface, as well as proper designing of the lug, are required to effect a satisfactory relugging operation. Furthermore, satisfactory relugging is based upon the premise of 100% adherence of the lug to the tire, since it is essential that the relugged tires be dependable.

It is an object of this invention, therefore, to provide lug stock for individually relugging off-the-road tires which may be readily applied to the tire body to effect satisfactory bonding thereto and to provide a dependable relugging operation.

Another object of this invention is to provide a replacement tire lug having an outer sealing border which seals off any void or area of non-adherence within the border to cause a partial vacuum effect to occur should stresses on the lug tend to enlarge such voids or areas of non-adherence, the vacuum assisting in the fixed retention of the lug.

A still further object of this invention is to provide lug stock so made that stresses within the stock after stitching but prior to vulcanization are reduced to a minimum.

Other objects and advantages of the present invention will become apparent to those skilled in the art from the following detailed description thereof, when read in conjunction with the accompanying drawings, in which Fig. 1 is a cross-sectional view of the standard trapezoidal lug stock, Fig. 2 is a cross-sectional view of the lug shown in Fig. 1 stitched in position on the tire body, Fig. 3 is a cross-sectional view of a concave base lug stock, Fig. 4 is a cross-sectional view of the lug stock shown in Fig. 3 stitched in position on the tire body, Fig. 5 is a cross-sectional view of the lug stock comprising the present invention, Fig. 6 is a cross-sectional view of the lug stock comprising the present invention stitched in position on the tire body, Figs. 7, 8 and 9 are cross-sectional views of the tire lug comprising the present invention in the stitched position on a variety of surfaces, and Fig. 10 is an enlarged sectional view of a fragment of the cross-section shown in Fig. 6.

It is customary in applying lug stock to tire bodies in the relugging operation to first buff the worn lugs to a predetermined height and to round off the corners. Where possible, it may be desirable to grind off the top of the lug to produce a perfectly flat surface so that the new lug will have a greater portion of its tread surface in contact with the ground at one time and thus result in greater traction. After buffing, the tire body is usually cleaned and a cement applied thereto over those surfaces where the lug stock is to be applied. A cushion of soft, tacky sheet material is applied to the base of the lug stock, which is then positioned over the cemented areas of the tire body and beaten into place by hammering or by some other suitable procedure. Such an application is known in the trade as "stitching." Following the stitching operation, the entire tire body, with the lug stock in place, is positioned in an oven and subjected to vulcanizing temperatures.

Since the present invention lies in the lug stock itself and in no way alters the conventional procedure of applying the lug stock, above outlined, these conventional process steps will not be discussed in detail, but will be understood to be included in the general process of applying the lug stock to the tire body.

Referring now to the drawings, Fig. 1 shows a section of a conventional trapezoidal, flat based lug stock 10 in place upon a tire body 11 over a rounded off portion of an old lug 12. In stitching the lug stock 10 to the tire body 11, pressure is exerted upon the tread 14 by hammering or the like to stitch a portion of the base 15 to the old lug 12. Then the edges 16—16 of the lug are forced downwardly and inwardly into contact with the rounded off portion of the old lugs, as shown in Fig. 2. This downward movement of the edges 16—16 deforms both sides of the lug 10 so as to set up stresses therein, shown diagrammatically by arrows in Fig. 2. As a result the top of the lug 14 becomes somewhat rounded, and these stresses which result from the deformation of the entire thickness of the lug 10 tend to pull the edges 16—16 free from the old lug portion. Consequently, tire lugs of this type cannot be satisfactorily employed in the relugging precess. Even applied to a perfectly flat surface, lug stock of this type has not been successfully employed on a large scale. Nevertheless, this is the only type of lug stock generally available.

Figs. 3 and 4 illustrate the application of a concave base type lug stock according to the method disclosed and claimed in applicant's Patent No. 2,474,013, issued June 31, 1949, and entitled "Tread Lug Rebuilding Method for Tires." The lug stock 18 has a concave base 19 having a slightly shorter radius of curvature than that of the buffed face 20 of the old lug 21. When pressure is applied to the tread 22, the lug 18 is forced downwardly so as to spread the outer edges 24—24 in the manner illustrated in Fig. 4. As shown by the arrows in Fig. 4, certain stresses are created upon stitching the lug 18 to the old lug 21, so that there is a tendency for the center portion of the lug stock 18 to move away from the buffed surface 20 as well as a tendency for edges 24 to move inwardly and downwardly. These stresses so affect the adherence of the lug to the tire body after stitching, but prior to vulcanization, that the method defined in the patent was devised to obtain good adherence. This method comprises removing a center portion of the protective cloth underlying the tacky cushion, stitching the exposed portion of the cushion to the central portion of the old lug 21, and then removing the remainder of the covering cloth from either side of the cushion and stitching the remainder of the new lug to the tire body. While this process is meticulous, requiring both time and skill upon the part of the operator, it is the only process by which the lug stock can be made to satisfactorily adhere to the tire body.

The present invention resides in a tire lug having wing-like portions or flanges extending away from the base thereof along either side of the upstanding lug body, and being sufficiently thin and resilient to provide a sealing border along the outer edge thereof. A preferred embodiment of the lug stock comprising the present invention is shown in Fig. 5 and includes a tread 25, a base 26, side walls 28—28 tapering inwardly towards the tread 25 and wing-like portions 29—29. The portions 29—29 are formed along the lower edge of the side walls 28—28 may extend outwardly and/or downwardly away from the body on either side thereof and have a relatively thin, triangular cross-section, with the base of the triangle adjacent the side walls 28—28. When this lug stock is stitched onto a tire body over the buffed surface of an old lug 30, the outer edge of each flange 29 forms a sealing border, indicated by the letter $a$ in Fig. 6. This sealing border $a$ has a very thin cross-section and is, therefore, so resilient that there are no stresses in this portion of the lug stock after the lug stock has been stitched to the tire body. Consequently, a perfect seal between the lug stock and the tire body is assured throughout this border area. According to the preferred form illustrated, the undersides of the flanges 29—29 extend inwardly below the lug body and the tread portion 25 thereof.

In applying a tire lug comprising the present invention to a tire body, it is preferable to select lug stock having approximately the same tread width as the old lug which it replaces. The tire body, and particularly the old lug portion and that portion of the tire surfaces adjacent the old lugs are buffed, cleaned and coated with cement in the usual manner. Although not shown in the drawings, a layer or a coating of adhesive or gum is applied to the lug stock along the base 26 and the under surface of the flanges 29—29, and this layer or coating is covered with the usual protective cloth. The layer may extend beyond the edges of the flanges to supplement the marginal seal.

In applying the lug shown in Fig. 5 to the tire body, it is only necessary to remove the protective cloth from the cushion, place the lug stock in place, and apply pressure to the tread 25 to stitch the base of the lug 26 to the old lug 30. The flanges 29—29 are then pounded downwardly and inwardly in order to stitch them to the previously prepared surfaces of the tire body and to the sides of the old lug 30. The sealing border $a$ readily and easily adheres to the tire body to provide perfect adherence due to the lack of stresses therein.

Alternatively, the lug may be partially applied by the method of my earlier Patent Number 2,474,013 by removing first a central longitudinal portion or zone of the protective cloth from the base 26, and stitching the area so exposed in place on the old lug in accordance with that method. Subsequently the remainder of the stock is applied by removing the remaining lateral portions of the protective cloth from the flanges 29—29 and stitching them down as above described.

Although proper application of the tire lug shown in Fig. 5 to the tire body results in good adhesion between all adjoining surfaces of the tire lug and the tire body, hasty or improper application may result in voids such as those illustrated at 31 and 32 shown in Fig. 6 (see Fig. 10 for detail). With the ordinary lug such voids would be fatal to the adherence of the lug stock to the tire body, but with the lug comprising the present invention, the voids 31 and 32 are sealed from the atmosphere by the sealing border $a$ formed by adherence of the flanges 29—29. Consequently, stresses which arise within the tire lug during use and which tend to enlarge voids 31 and 32, will be partially counteracted by the vacuum created within the voids.

A comparison of Figs. 2, 4 and 6 further shows that the improved tire lug 28 provides an unstressed border area $a$ along the lower edge of the lug, whereas both the flat bottom and concave type lug develop considerable residual stress in the highly critical area along the lower edges thereof.

Figs. 7, 8 and 9 graphically illustrate the adaptability of the improved tire lug to a variety of surfaces. The standard flat bottom lug can be applied only to a flat surface with any success. The concave base lug must be relatively carefully fitted to the old lug portion 21, and the surface of the old lug 21 must be carefully buffed to obtain the proper radius of curvature. As shown in Fig. 7, the improved type lug 34 may be readily applied to an old lug portion 35 whose base is considerably wider than the tread 36 of the lug 34. Although not specifically illustrated, the improved tire lug may also be applied to an old lug portion having a base narrower than the tread 36. This latter procedure is not a preferred one, however, because undesirable stresses may be created during the stitching operation. The application of a tire lug 38 of the type comprising the present invention to an old tire lug 39 buffed in the manner employed in connection with the concave tire lug 18 in Figs. 3 and 4, is illustrated in Fig. 8. Here again the outer edges 40 of flanges 41 form a sealing border wherein little if any stresses are present tending to separate the flanges from the old lug.

In Fig. 9, an improved type lug 42 is applied to a flat surface 44 and, although certain stresses are created within the lug body, as shown by the arrows, the sealing border b effectively creates a vacuum acting to hold the lug 42 in place after the stitching operation and during the vulcanization step.

In addition to being adaptable to a variety of surfaces, the improved tire lug comprising the present invention may vary considerably in regard to tread width, height of the tread, the length of the flange and the angle at which the flange projects. The width or cross-section of the flange may also vary considerably depending upon the type of material of which the lug is made, but the thickness of the flange should be so regulated that there is an outer sealing border in which little or no stress exists after the stitching operation. In the event that it is desired to create a flange at either end of the lug, as well as at the sides, so that the entire lug will be surrounded by a projecting flange adjacent the base thereof, the individual tire lugs may be molded with this flange in place, or lug stock may be cut off into the desired lengths and partially cut away at either end to produce the flanges.

It is apparent from the above detailed description that the improved tire lugs comprising the present invention is advantageous in that the outer portion of the flanges which form a part of the lug provide a sealing border which is practically free from stress after the stitching operation and prior to vulcanization. This sealing border, therefore, consistently provides satisfactory adhesion between the lug and the tire body to provide a dependable and effective bonding. The triangular cross-section of the flange is important, since the greatest stresses to which the lug is subjected are those arising at the junction of the flange and the lug body, and this enlarged portion of the flange is necessary to successfully withstand these extreme stresses. After vulcanization, the improved tire lug is practically free from residual stress, since the only portion of the lug that is deformed during the stitching operation is the relatively thin flange member, the lug body proper remaining undeformed. These improved lugs are easily and readily applied without requiring any particular skill, and are so shaped as to produce effective bonding even when the lug is imperfectly applied to the tire body. Because of the ready adaptability of the improved tire lug to a variety of surfaces, a minimum of buffing is required, which both shortens and lowers the cost of the overall operation.

What I claim is:

1. Lug stock for individually relugging heavy duty tires, said stock having a generally rectangular, upstanding body, and wing-like flanges of relatively thin cross section integral with said body and joined thereto adjacent the base thereof, said flanges having a length extending away from said body substantially greater than the thickness thereof where joined to said body.

2. Lug stock in accordance with claim 1 in which said flanges gradually decrease in cross-section to a minimum thickness at their outer edges.

3. Lug stock in accordance with claim 2 in which the upper surfaces of the wing-like flanges join and blend into the surfaces of the body along curved lines.

4. An improved elongated lug stock for relugging tires, said lug stock comprising a body having a generally flat tread, a base generally parallel to the tread, and opposed sidewalls tapering inwardly from the base to the tread, wing-like flanges extending laterally outwardly from the lug body, said flanges having upper surfaces blending along curves into the surface of the lug body at a point along the sidewalls near the base and lower surfaces continuous with the lower surface of said lug body, said upper and lower surfaces tapering toward the outer edge of the flanges to provide relatively thin, flexible outer sealing borders.

5. In a tire lug having a body comprising a tread, a base, and sidewalls connecting the base and tread, a relatively thin flange extending outwardly on either side of the entire base of the lug and having a triangular cross-section with the base of the triangle adjacent the lug body.

6. In an improved lug stock having a body comprising a tread, a base, and opposed sidewalls extending from the base to the tread, a flange extending outwardly from the base of the lug and tapering from a relatively thick section adjacent the lug body to approximately a point at its outer edge, the outer portion of the flange forming a sealing border so thin in cross section that substantially no internal stresses are created therein during the application of the stock to a surface.

VAUGHN RAWLS.

REFERENCES CITED

The following references are of record in the file of this patent:

UNITED STATES PATENTS

| Number | Name | Date |
| --- | --- | --- |
| 798,195 | Locher | Aug. 29, 1905 |
| 1,303,865 | DeRooy | May 20, 1919 |
| 2,177,165 | Beckman | Oct. 24, 1939 |
| 2,180,649 | White | Nov. 21, 1939 |
| 2,180,650 | White | Nov. 21, 1939 |
| 2,224,141 | Clark | Dec. 10, 1940 |
| 2,474,013 | Rawls | June 21, 1949 |

FOREIGN PATENTS

| Number | Country | Date |
| --- | --- | --- |
| 555,976 | Great Britain | Sept. 15, 1943 |